United States Patent [19]

Bish

[11] Patent Number: 5,118,142
[45] Date of Patent: Jun. 2, 1992

[54] TRACTION DEVICE

[76] Inventor: Stephen L. Bish, 1350 Rohrsville Rd., Knoxville, Md. 21758

[21] Appl. No.: 594,625

[22] Filed: Oct. 9, 1990

[51] Int. Cl.$^5$ .............................................. B60B 39/04
[52] U.S. Cl. ........................................ 291/46; 291/25; 222/486
[58] Field of Search .................... 291/25, 34, 44, 46, 291/47; 222/486; 239/242, 542, 546

[56] References Cited

U.S. PATENT DOCUMENTS

| 734,331 | 7/1903 | Howery | 291/46 |
| 897,985 | 9/1908 | Mentzel et al. | 291/34 X |
| 1,832,581 | 11/1931 | Riley | 291/46 X |
| 2,016,419 | 10/1935 | Elston | 291/46 X |
| 2,196,977 | 4/1940 | Cambell et al. | 291/46 X |
| 2,307,798 | 1/1943 | Kook et al. | 291/25 |
| 2,598,961 | 6/1952 | Andrus | 239/542 X |
| 2,606,781 | 8/1952 | Loftus | 291/46 X |
| 3,121,578 | 2/1964 | Moses | 291/46 |
| 3,185,512 | 5/1965 | Kilgore | 291/46 |
| 3,423,024 | 1/1969 | Morawetz | 239/242 |

FOREIGN PATENT DOCUMENTS 243160 11/1925 United Kingdom ............... 291/34

Primary Examiner—Robert J. Spar
Assistant Examiner—James Ellen
Attorney, Agent, or Firm—Leon Gilden

[57] ABSTRACT

An apparatus including a container directing a sand mixture through a plurality of conduits, a conduit associated with each drive wheel of an automobile through an intermediate valve body operatively opened by a cable mechanism. The organization is typically mounted within an engine compartment of an automobile. Further, the organization utilizes a nozzle head mounted at a terminal end of each conduit adjacent each wheel, with each nozzle head utilizing an apertured dispersion plate, wherein each aperture is selectively closed to define a selective width of path of sand directed adjacent each drive wheel of the automobile.

1 Claim, 4 Drawing Sheets

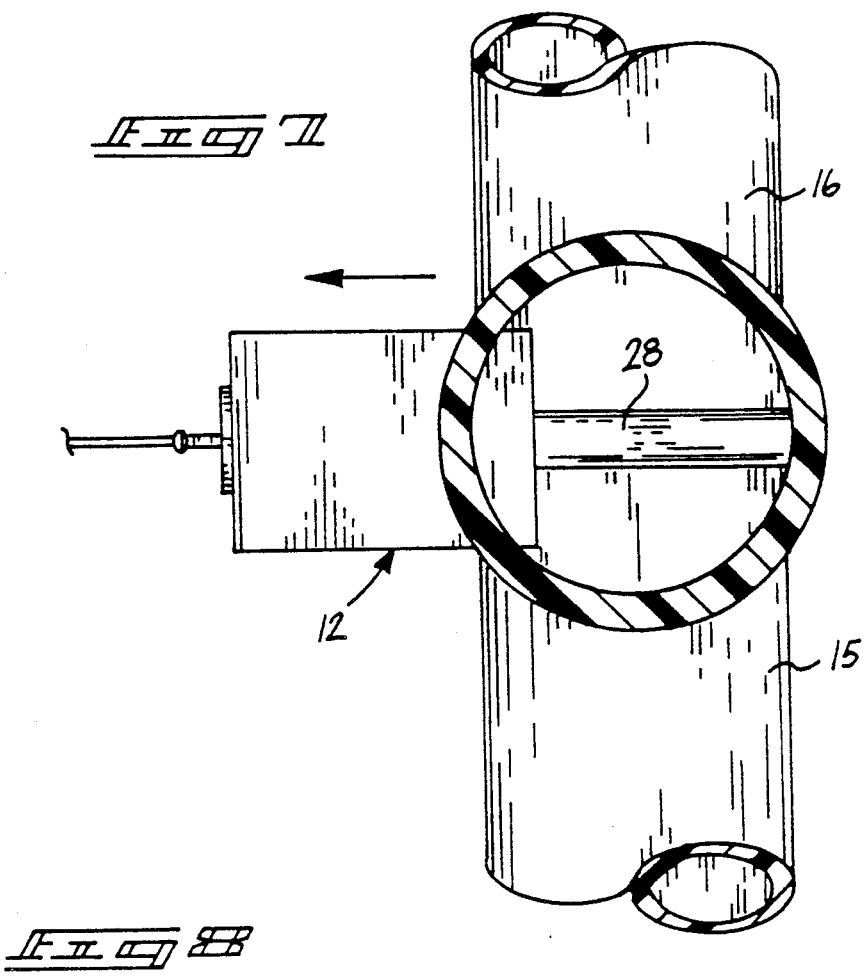
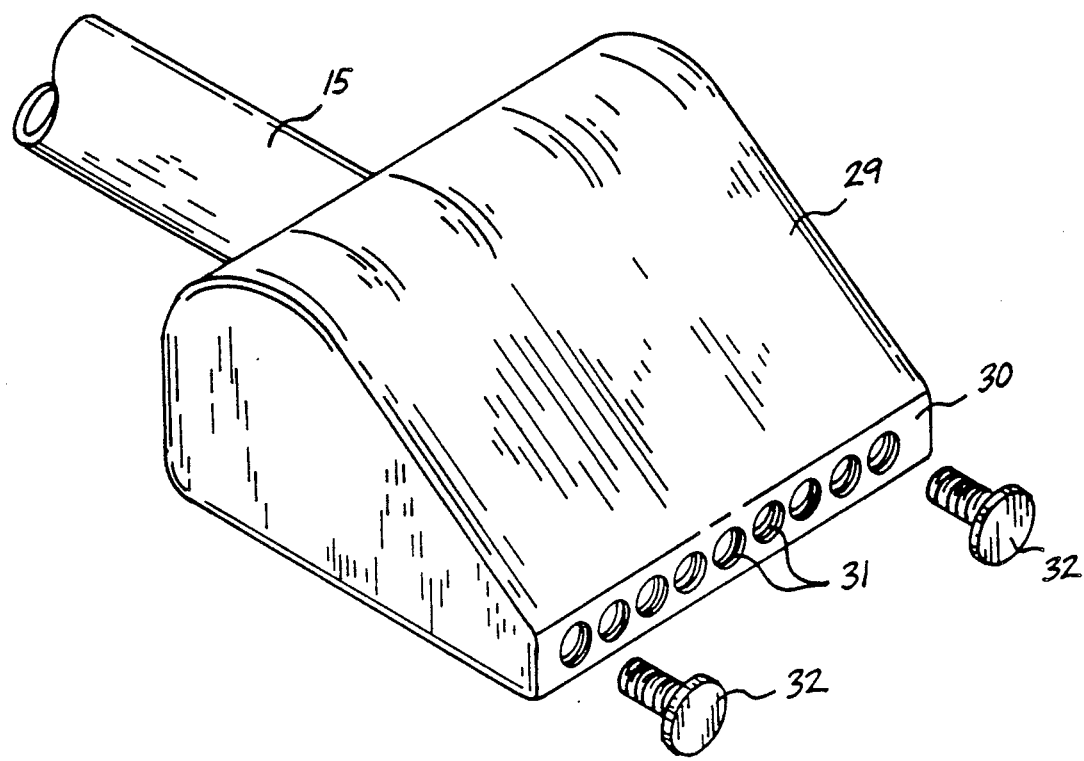

TRACTION DEVICE

BACKGROUND OF THE INVENTION

1. Field of the Invention

The field of invention relates to a sand delivery device, and more particularly pertains to a new and improved traction device wherein the same provides dispersion of a sand mixture to a drive wheel of a self-propelled vehicle.

2. Description of the Prior Art

Sand application devices of various types have been utilized with self-propelled vehicles in the prior art. Such devices have generally been of a fairly elaborate or extensive organization, as opposed to the instant invention setting forth a compact and readily adjustable organization for use with a drive wheel of an associated self-propelled vehicle. Examples of the prior art include U.S. Pat. No. 3,121,578 to Moses wherein a conduit is operatively associated with a source of compressed air to direct a sand mixture to a drive wheel of an associated vehicle.

U.S. Pat. No. 2,606,781 to Loftus sets forth a sand pipe dispensing nozzle configured for use with an application of sand to assist in providing traction to a drive wheel.

U.S. Pat. No. 2,016,419 to Elston sets forth a sander for use with vehicles utilizing an elaborate valving mechanism to direct sand into an associated wheel of a vehicle.

U.S. Pat. No. 2,196,977 to Campbell, et al. sets forth a sander mechanism utilizing pressurized sand through an associated nozzle directed at a vehicular wheel.

U.S. Pat. No. 3,185,512 to Kilgore sets forth a sand delivery nozzle for use in application of sand to a vehicular wheel, such as a train.

As such, it may be appreciated that there continues to be a need for a new and improved traction device as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of sander devices now present in the prior art, the present invention provides a traction device wherein the same sets forth a predetermined quantity and width of sand to an associated drive wheel of a vehicle to enhance traction thereof. As such, the general purpose of the present invention, which will be described subsequently in greater detail, is to provide a new and improved traction device which has all the advantages of the prior art sand application devices and none of the disadvantages.

To attain this, the present invention provides an apparatus including a container directing a sand mixture through a plurality of conduits, a conduit associated with each drive wheel of an automobile through an intermediate valve body operatively opened by a cable mechanism. The organization is typically mounted within an engine compartment of an automobile. Further, the organization utilizes a nozzle head mounted at a terminal end of each conduit adjacent each wheel, with each nozzle head utilizing an apertured dispersion plate, wherein each aperture is selectively closed to define a selective width of path of sand directed adjacent each drive wheel of the automobile.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved traction device which has all the advantages of the prior art sand application devices and none of the disadvantages.

It is another object of the present invention to provide a new and improved traction device which may be easily and efficiently manufactured and marketed.

It is a further object of the present invention to provide a new and improved traction device which is of a durable and reliable construction.

An even further object of the present invention is to provide a new and improved traction device which is susceptible of a low cost of manufacture with regard to both materials and labor, and which accordingly is then susceptible of low prices of sale to the consuming public, thereby making such traction devices economically available to the buying public.

Still yet another object of the present invention is to provide a new and improved traction device which provides in the apparatuses and methods of the prior art some of the advantages thereof, while simultaneously overcoming some of the disadvantages normally associated therewith.

Still another object of the present invention is to provide a new and improved traction device wherein the same directs a predetermined quantity of sand through a valve manifold and to a dispersion nozzle to effect application of a variable width of sand to a position proximate a drive wheel to enhance traction of the drive wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view, taken along the lines 7—7 of FIG. 6, in the direction indicated by the arrows.

FIG. 8 is an isometric illustration of a nozzle head utilized in association with each terminal end of each conduit.

DESCRIPTION OF THE PREFERRED EMBODIMENT

Figure 1:
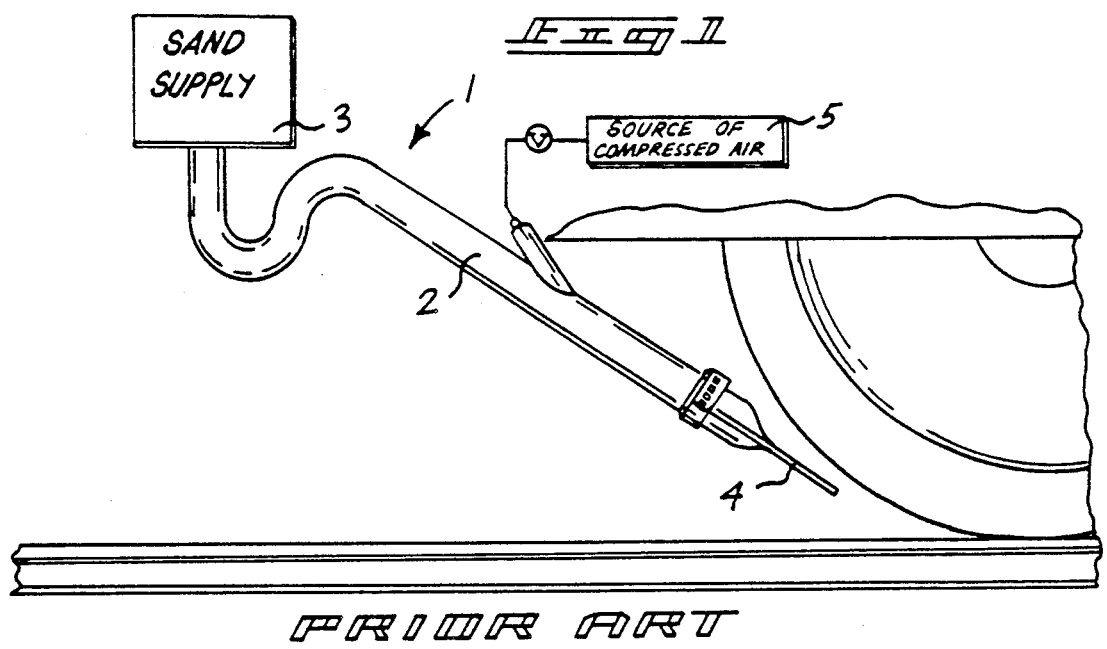
FIG. 1 is an orthographic side view, taken in elevation, of a prior art sanding device.
Figure 2:
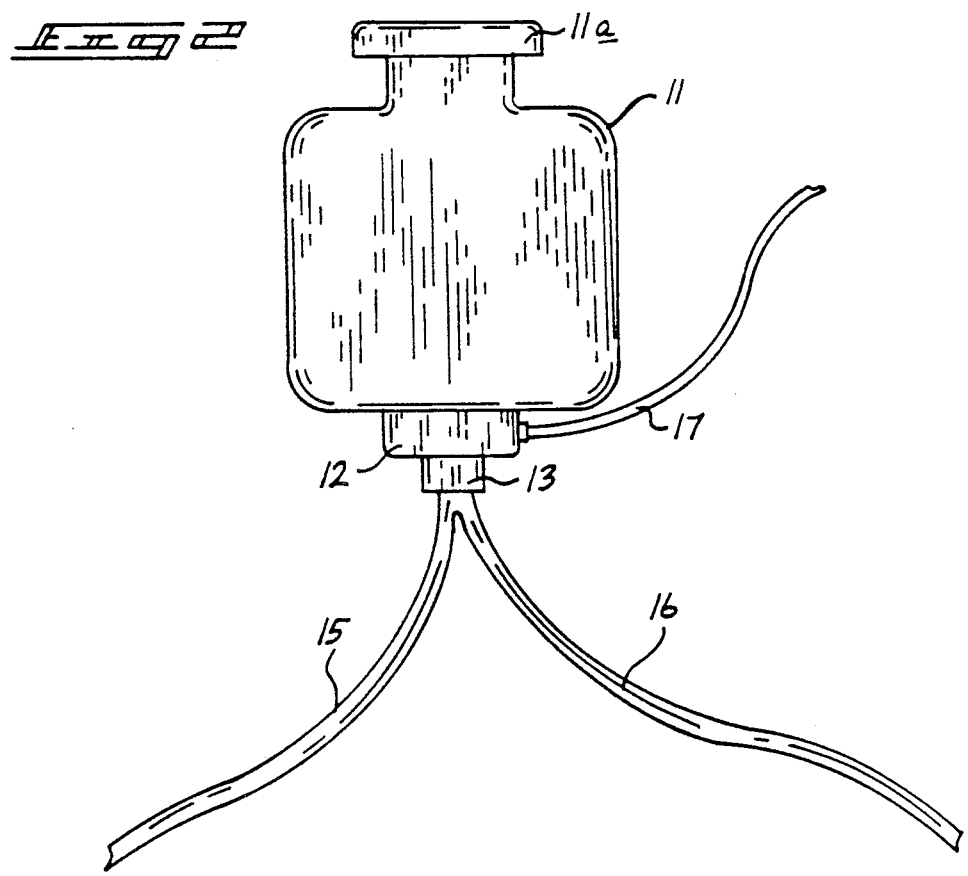
FIG. 2 is a diagrammatic illustration of the invention in association with a plurality of conduits.

With reference now to the drawings, and in particular to FIGS. 1 to 8 thereof, a new and improved traction device embodying the principles and concepts of the present invention and generally designated by the reference numeral 10 will be described.

FIG. 1 illustrates a prior art sand application device 1, wherein a conduit 2 directs a predetermined quantity of sand from a reservoir 3 adjacent a drive wheel through a nozzle 4 by utilization of a source of compressed air 5 to enhance flow of sand through the nozzle, in a manner as set forth in U.S. Pat. No. 3,121,578.

Figure 3:
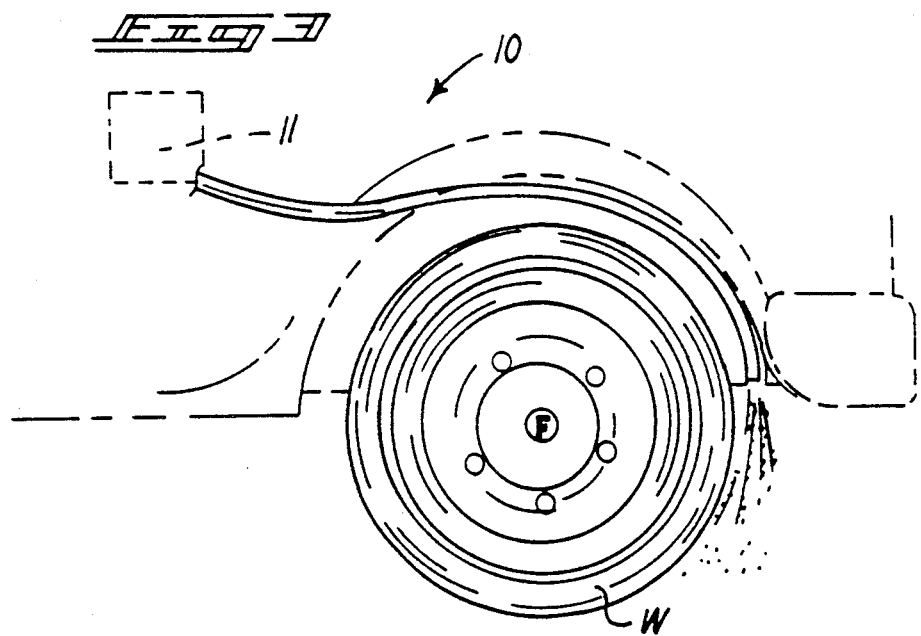
FIG. 3 is a diagrammatic illustration of the instant invention mounted within an engine compartment and positioning of one of a plurality of conduits adjacent a typical drive wheel.
Figure 4:
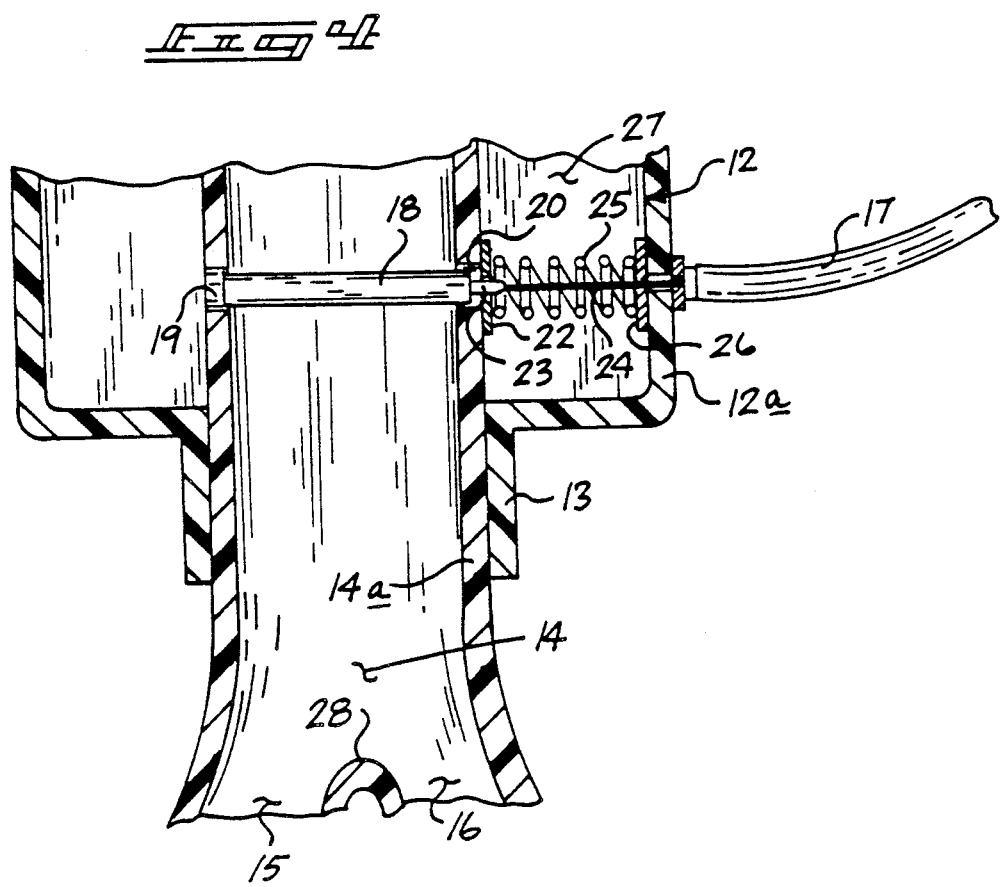
FIG. 4 is an orthographic cross-sectional illustration of the valve utilized by the instant invention.
Figure 5:
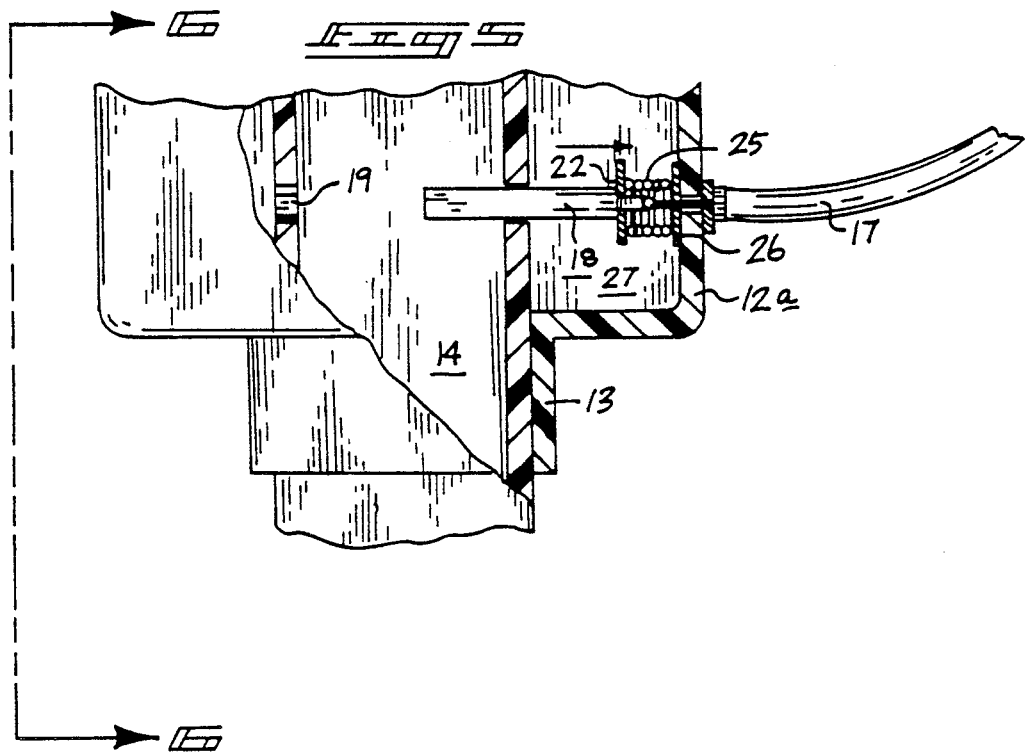
FIG. 5 is an orthographic view, partially in section, of the valve mechanism with the associated valve plate in a retracted orientation.
Figure 6:
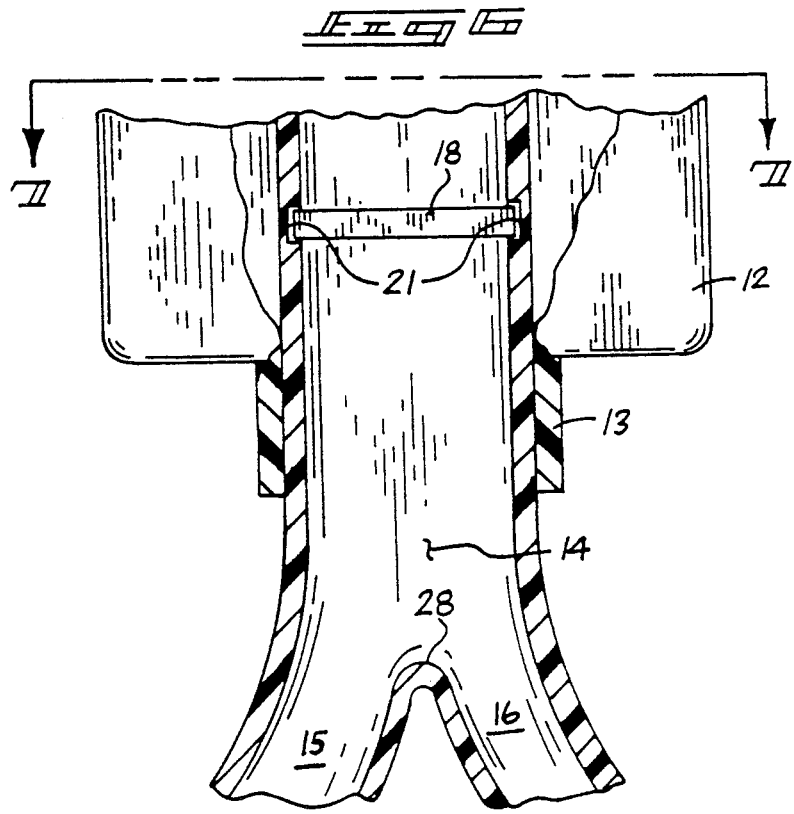
FIG. 6 is an orthographic view, taken along the lines 6—6 of FIG. 5, in the direction indicated by the arrows, partially in section.

More specifically, the traction device 10 of the instant invention essentially comprises a container reservoir 11 for containing a sand supply, with a lid 11a mounted at an upper end thereof, with the container 11 mounted within an engine compartment of an automobile, such as illustrated in FIG. 3, with the reservoir spaced above associated drive wheels "W" of the automobile. The container 11 includes a valve body 12 mounted to a bottom surface thereof in communication with the sand supply contents of the container. The valve body 12 includes a securement sleeve 13 coaxially aligned with the valve body mounting a manifold conduit 14, with the manifold conduit 14 dividing a flow of the sand supply through the valve body, through the manifold conduit, and into a respective first and second conduit 15 and 16, with each respective manifold conduits' free terminal end positioned forwardly of an associated drive wheel "W" of a self-propelled vehicle. A divider ridge 28 divides a flow of the sand supply into the respective first and second conduits and is formed as a smooth arcuate member to minimize turbulence of sand flow through the first and second conduits in use. Reference to FIGS. 4 and 5 for example illustrate the valve body 12, including a cable housing 17 directed from the valve body into conveniently a passenger compartment of an associated automobile to permit remote engagement of the valve. The cable housing includes a cable 24 slidably mounted throughout the cable housing and with the cable 24 mounted at its forward terminal end to a securement boss 23. The securement boss 23 is mounted to a rear edge of a reciprocatably mounted valve plate 18 that is reciprocatably mounted within a manifold conduit 14 in an orthogonal orientation relative to an axis defined through the manifold 14. The valve plate is mounted in a forward slot 19 and a rear slot 20 that are diametrically opposed relative to one another to permit reciprocation of the valve plate and alignment thereof, with the sides of the valve plate mounted in side groove 21 (see FIG. 6) to align and position the valve plate in its reciprocation throughout its travel within the manifold conduit 14 from a first position, as illustrated in FIG. 4 in an extended orientation, to a retracted second position, as illustrated in FIG. 5, to permit a sand flow through the manifold conduit 14. A forward abutment plate 22 is mounted about the securement boss 23 exteriorly of the manifold conduit wall 14a within a housing cavity 27 of the valve body 12. Also mounted within the housing cavity 27 coaxially aligned with the forward abutment plate is a rear abutment plate 26 mounted interiorly of a spaced wall of the valve body 12 relative to the manifold conduit wall. The forward and rear abutment plates capture a spring 25 therebetween, with the cable 24 directed through the spring, whereupon retraction of the valve plate 18 to the second position, as illustrated in FIG. 5, compresses the spring and upon release of the cable, effects extension of the valve plate to its first position, as illustrated in FIG. 4, to normally cease flow of a sand supply through the manifold conduit 14.

FIG. 8 illustrates the use of a nozzle head 29 mounted at each free terminal end of the first and second conduit 15 and 16, with the nozzle head defined by a width substantially greater than the diameter of an associated conduit. The nozzle head 29 includes a dispersion plate 30 orthogonally oriented relative to an axis of an associated first and second conduit 15 or 16. The dispersion plate 30 includes a series of spaced and aligned threaded apertures 31 that selectively receive one of a plurality of threaded plug members 32. Use of the threaded plug members permits adjustment of volumetric flow of a sand supply through the nozzle head 29, as well as permitting disbursement of a predetermined width of sand directed adjacent an associated drive wheel to permit a combination of various widths of drive wheels, as well as application of various widths of sand supply as required by various climatic conditions.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united States is as follows:

1. A traction device mounted within a self-propelled vehicle to direct a flow of granular traction material forwardly of each drive wheel of the vehicle, wherein the traction device comprises, a container, the container arranged for mounting interiorly of the self-propelled vehicle, and including an underlying valve body mounted at the bottom surface of the container, the valve body positioned in operative association with a manifold conduit, the manifold conduit defined about a longitudinal axis, with the manifold conduit directing flow of the granular material from the container therethrough, and a first conduit and a second conduit, each mounted to a lower terminal end of the manifold conduit, with the first and second conduit including a respective first and second free terminal end for positioning adjacent each associated drive wheel, and wherein the valve body includes a valve plate means reciprocatably mounted within the valve body for permitting selective flow of the granular material through the manifold conduit, and wherein the valve plate means includes a valve plate slidably mounted orthogonally relative to the longitudinal axis, and the manifold conduit including a forward slot diametrically aligned with a rear slot directed through the manifold conduit, and the valve plate reciprocatably mounted between the forward and rear slots, and the valve plate including side edges, with each side edge mounted within a respective side groove, with each side groove formed within the manifold conduit, the side grooves orthogonally oriented relative to the forward and rear slots to align the valve plate within the manifold conduit for reciprocation, and wherein the valve plate means further includes a securement boss mounted fixedly to a rear edge of the valve plate, and the securement boss mounted within a housing cavity of a valve body mounted to the manifold conduit, the securement boss including a forward abutment plate positioned within the housing cavity adjacent the valve plate in surrounding relationship relative to the securement boss, and a rear abutment plate mounted in the housing cavity spaced from the forward abutment plate, wherein the forward abutment plate and the rear abutment plates are aligned relative to one another, and a spring is captured and mounted between the forward abutment plate and the rear abutment plate, and a cable is directed through the housing cavity and secured to the securement boss, the cable is directed through the forward abutment plate and the rear abutment plate medially of the spring, and wherein each of the first and second conduits include a respective first and second free terminal end spaced from the manifold conduit, and each respective first and second free terminal and includes a nozzle head mounted thereon, and wherein the nozzle head is defined by a predetermined width, wherein each respective first and second conduit is defined by a respective predetermined diameter, wherein the predetermined width is greater than the predetermined diameter, and wherein the nozzle head includes a dispersion plate orthogonally oriented relative to each axis of the respective first and second conduit, the dispersion plate is mounted within each head spaced from each conduit, and each dispersion plate includes a series of spaced and aligned threaded apertures, the threaded apertures further include a threaded plug member removably mounted relative to each aperture to effect flow of granular material through the dispersion plate.

* * * * *